US009438331B2

(12) United States Patent
Mills et al.

(10) Patent No.: US 9,438,331 B2
(45) Date of Patent: Sep. 6, 2016

(54) SYSTEM AND METHOD TO MONITOR AND CONTROL REMOTE SENSORS AND EQUIPMENT

(71) Applicant: Bluetick, Inc., Greensboro, NC (US)

(72) Inventors: Michael C. Mills, Summerfield, NC (US); Matthew P. Krupinski, III, Greensboro, NC (US); Luis G. Rodriguez Chiappetta, Summerfield, NC (US); Benjamin Allen Fons, Browns Summit, NC (US)

(73) Assignee: BLUETICK, INC., Greensboro, NC (US)

( * ) Notice: Subject to any disclaimer, the term of this patent is extended or adjusted under 35 U.S.C. 154(b) by 0 days.

(21) Appl. No.: 14/659,531

(22) Filed: Mar. 16, 2015

(65) Prior Publication Data

US 2015/0195034 A1    Jul. 9, 2015

Related U.S. Application Data

(62) Division of application No. 13/274,070, filed on Oct. 14, 2011, now Pat. No. 8,982,768.

(51) Int. Cl.
| | |
|---|---|
| *H04B 7/14* | (2006.01) |
| *H04B 1/16* | (2006.01) |
| *H04B 7/185* | (2006.01) |
| *H04W 24/06* | (2009.01) |
| *H04L 12/66* | (2006.01) |
| *H04W 24/10* | (2009.01) |

(Continued)

(52) U.S. Cl.
CPC ........... *H04B 7/18523* (2013.01); *H04L 12/66* (2013.01); *H04W 24/06* (2013.01); *H04W 24/10* (2013.01); *H04W 52/02* (2013.01); *H04W 92/02* (2013.01)

(58) Field of Classification Search
CPC ........... H04W 52/0212; H04W 52/02; H04W 24/10; H04W 24/06; H04W 92/02; H04B 7/18523; H04L 12/66
USPC .......................................... 370/315
See application file for complete search history.

(56) References Cited

U.S. PATENT DOCUMENTS

| 7,075,412 B1 * | 7/2006 | Reynolds ........... G06K 7/10297 340/10.2 |
| 7,359,647 B1 * | 4/2008 | Faria ...................... H02J 17/00 398/113 |
| 8,583,100 B2 | 11/2013 | Koziy et al. |

(Continued)

*Primary Examiner* — Gerald Smarth
(74) *Attorney, Agent, or Firm* — Loza & Loza, LLP; Michael I. Angert

(57) ABSTRACT

A processor, memory, first transceiver, second transceiver, plurality of wired and wireless ports, and a power system storing excess energy. Multiple similar systems may mesh communication via first transceiver. Unencrypted data from ports are packaged into unencrypted data structures and forwarded to the second transceiver for transmission according to the telecommunications standard of the second transceiver. A method may include determining if either a predefined time to sample data was reached or if an interrupt was received, and then sampling ports associated with the predefined time or interrupt, to collect data from remote sensors or equipment coupled to the ports, process the sampled data, store the processed data in memory, and evaluate the stored data against a set of rules. If no rules are violated, the sampling continues, and the processed data is packaged and transmitted to a server at a prescheduled time. Actions are taken if rules are violated.

20 Claims, 8 Drawing Sheets

(51) Int. Cl.
*H04W 52/02* (2009.01)
*H04W 92/02* (2009.01)

(56) References Cited

U.S. PATENT DOCUMENTS

| | | |
|---|---|---|
| 8,594,866 B1 | 11/2013 | Chen et al. |
| 2001/0035198 A1 | 11/2001 | Carawan et al. |
| 2003/0002482 A1* | 1/2003 | Kubler ................ G06F 1/1626 370/352 |
| 2003/0090233 A1 | 5/2003 | Browe |
| 2005/0195775 A1* | 9/2005 | Petite ................ H04W 72/082 370/338 |
| 2005/0243491 A1 | 11/2005 | Tanis |
| 2007/0010210 A1* | 1/2007 | Singh ................ H04B 7/18515 455/73 |
| 2007/0040647 A1 | 2/2007 | Saenz et al. |
| 2008/0059988 A1* | 3/2008 | Lee ........................ G06Q 30/02 725/9 |
| 2008/0287748 A1 | 11/2008 | Sapounas et al. |
| 2009/0105982 A1 | 4/2009 | Sarig et al. |
| 2010/0191370 A1 | 7/2010 | Barragan Trevino et al. |
| 2011/0112690 A1* | 5/2011 | Caron ................ G05B 15/02 700/275 |
| 2013/0046847 A1 | 2/2013 | Zavesky et al. |

* cited by examiner

| Procedure Description | Direction | Payload Length 4 bits | Version 4 bits | Msg Type 8 bits | Payload | |
|---|---|---|---|---|---|---|
| Wake up processor to do a poll request | System <-- Server | 0x0 | 0x4 | WAKE_UP_NOTIFICATION | PRCSSR_ID 32-bit | |
| Accept wake up to poll device | System --> Server | 0x0 | 0x4 | WAKE_UP_ACCEPT | PRCSSR_ID 32-bit | |
| Reject wake up | System --> Server | 0x4 | 0x4 | WAKE_UP_REJECT | PRCSSR_ID 32-bit | Error Code 32-bit |
| Let server know that processor is ready | System --> Server | 0x4 | 0x4 | PRCSSR_READY_NOTIFICATION | PRCSSR_ID 32-bit | |

FIG. 5

| Procedure Description | Direction | Payload Length 4 bits | Version 4 bits | Msg Type 8 bits | Payload | | |
|---|---|---|---|---|---|---|---|
| Notify server that new stats are ready for upload | System --> Server | 0xC | 0x4 | UL_INIT_NOTIFICATION | Processor_ID 32-bit | File Size 32-bit | DateTime 32-bit ** |
| Let processor know that server is ready to accept data | System <-- Server | 0x0 | 0x4 | UL_INIT_CONFIRM | | | |

| Procedure Description | Direction | Payload Length 4 bits | Version 4 bits | Msg Type 8 bits | Payload Length Secondary 16 bits | Payload | | |
|---|---|---|---|---|---|---|---|---|
| Send raw data to server | System --> Server | 0xF | 0x4 | UL_DATA | 4 + 4 + n | Processor_ID 32-bit | DateTime 32-bit ** | Data zipped n bytes |
| Let processor know that data upload failed | Server --> System | 0x0 | 0x4 | UL_XFER_FAILURE | | | | |
| ACK processor that server received upload data successfully | Server --> System | 0x0 | 0x4 | UL_COMPLETE | | | | |

FIG. 7

SYSTEM AND METHOD TO MONITOR AND CONTROL REMOTE SENSORS AND EQUIPMENT

CROSS-REFERENCE TO RELATED APPLICATIONS

This application claims priority to and is a divisional of prior U.S. patent application Ser. No. 13/274,070, filed Oct. 14, 2011, the entire contents of which are hereby incorporated by reference herein.

BACKGROUND OF THE INVENTION

The present invention relates to systems and methods for monitoring sensors of equipment and/or control of equipment. More specifically, the present invention relates to the monitoring and control of equipment that operates with little, if any, human intervention. Even more specifically, the present invention relates to self-sustaining, autonomous, monitoring, reporting, and control systems powered by renewable energy.

Machines that operate for the most part without human intervention are ubiquitous in our society. Familiar examples of such machines include the electric motors and associated compressors of residential refrigerator and air conditioning units used in our homes. Less familiar machines that operate for the most part without human intervention may be located far from our communities, in locations that are often unobserved by the public and unfrequented by even the persons that own or operate the machinery. Examples of these machines include turbines, compressors, pumps, and storage tanks used, for example, in the oil and natural gas industry.

Industrial equipment, such as the just mentioned machines used in the oil and natural gas industry, is often located in areas that are so remote that access to hardwired communication lines is often unavailable. Despite the remoteness of the location and the lack of communications, the equipment at any given site must be routinely monitored.

Monitoring of industrial equipment at any site is critical to safe and cost efficient operation of the site. By monitoring operating parameters of the site's equipment, an owner/operator is often able to identify problems before they become serious. Even a seemingly minor failure of a first machine can induce a major failure of an associated second machine. As used herein, a minor failure is one that does not cause complete stoppage of a machine, while a major failure can cause complete stoppage of a machine, environmental damage, or even loss of life or property.

Control of industrial equipment at a site is also critical to safe and cost-efficient operation of the site. For example, if alerted to a minor failure of a first machine, the owner or operator may beneficially decide to shut down both the first and second machines to mitigate operating losses.

Because of the remoteness of many sites, and despite the need for frequent monitoring and control of the equipment at these sites, most sites receive only routine periodic visits for purposes of maintenance. Routine periodic visits may maintain the machines in working order, but there are times when routine periodic visits are insufficient. For example, a coolant level in a radiator of a pump motor might be routinely inspected once a month, however, an unexpected coolant leak might occur shortly after a physical inspection. Before the next physical inspection occurs, the radiator might become inefficient causing the pump motor to run hot and eventually seize, resulting in a major failure of the pump motor.

Improvements in site monitoring might be possible if all equipment at a given site included integrated means that would make it possible for each machine to periodically "phone-in" its status. Unfortunately, this situation does not exist. Improvements might also be possible if all equipment at a given site operated according to a single standard for communication of status. Again, this situation does not exist. Even if some solution to the problem of the lack of any means to promptly, or even spontaneously, collect the status of machines at a given site existed, the problem of communicating the collected status to a person responsible for maintaining the machines is still present. Today, there are no known sites that contain an integrated system that can collect diverse reports of the status of multiple machines and record that information, or record and transmit that information from locations that have no access to hardwired communication networks.

Consequently, the typical practice of today is to have a worker travel to each site to observe and record data presented by each machine and/or associated sensor. Sites might be separated by tens of miles from each other. Typically, one worker will travel a route, from site to site, collecting data. This method of data collection is time consuming, wasteful of fuel (e.g., gasoline required for the worker to travel his circuit), and human resources. The repetitive nature of the work may be boring to the worker. Boredom and complacency may lead to improper recording of data.

At each site, the worker observes multiple analog and digital gauges. Readings from the gauges may be manually recorded. In many instances, even if data is collected at the site by a processor-equipped device, the data output by the device is not "user friendly." That is, the data is not immediately usable by the worker because it is presented as an alphanumeric code, rather than a meaningful statement. For example, a gas flow analyzer might display the code "ERR 013." To the worker in the field, without a table to cross-reference the code to a meaningful statement, the code is nothing more than a series of characters to be recorded on a data log.

The worker eventually delivers the collected data to one or more data collection areas, where the data is analyzed. If analysis indicates an anomaly in any operating parameter of the equipment, the worker may again be dispatched to the site for closer analysis of the equipment or to adjust equipment controls (including shutting down equipment) to take preventive action. At this time, especially in a case of a remote-site that is not connected to telephone infrastructure, monitoring of equipment at the remote site cannot be performed via the Internet or mobile telephone. Additionally, there is no known system that can remotely and securely apply control signals on demand (as opposed to automatically) to adjust the performance of, or shut down, one or more pieces of equipment at a site when the site has no access to hardwired communication infrastructure.

The inability to remotely collect data and control equipment at oil and natural gas sites may lead to dangerous situations. Oil and gas production involves the handling of substances that are toxic to humans and wildlife. These substances cause environmental pollution if they are spilled or released. Monitoring of the equipment at remote oil and gas production sites is critical to maintaining the machinery in good and safe working order. Undetected degradation in the integrity of the equipment at an oil and gas site can have detrimental effects to both the machines and the environment.

SUMMARY OF THE INVENTION

The systems and methods of the invention as presented herein are directed to solving one or more of the problems identified above. Additional features and advantages of the invention will be set forth in the description that follows, and in part will be apparent from the description, or may be learned by practice of the invention. The advantages of the invention will be realized and attained by the systems and methods particularly pointed out in the written description and claims hereof as well as the appended drawings.

To achieve these and other advantages and in accordance with the purpose of the present invention, as embodied and broadly described, a self-sustaining autonomous monitoring, reporting, and control system is presented. The system may be powered by renewable energy. The system may additionally or alternatively be powered by conventional AC power.

According to one embodiment of the system, the system may include a processor, a memory, a first radio transceiver, operating according to a first telecommunications standard, a second radio transceiver, operating according to a second telecommunications standard, a communications bus for communication between the various components of the system, a plurality of wired ports, a plurality of wireless ports, and a power system configured to convert energy into respective operating voltages for at least the processor, the memory, and the first and second radio transceivers and store excess energy. The processor may receive unencrypted data from the first and second pluralities of data channels, package the unencrypted data into predefined unencrypted data structures, and forward the packaged unencrypted data to the second radio transceiver, where the packaged unencrypted data is transmitted according to the second telecommunications standard.

A method in accordance with an embodiment of the invention includes determining, at the system that either a first predefined time to sample data was reached, or an interrupt was received at the processor of the system, sampling, by the processor, of ports associated with the predefined time or the interrupt, to collect data from the respective remote sensors or equipment coupled to the ports, processing the sampled data, storing the processed data in a memory of the system, evaluating the stored data against a predefined set of rules, where, if none of the rules are violated the sampling by the processor continues, and, upon reaching a second predefined time the processed data is packaged and a message, including the processed packaged data, may be transmitted to the server, but, if a predefined rule is violated, a message is transmitted to the server, which includes an alarm and data related to the rule that was violated.

According to still another embodiment, a method includes sampling the ports coupled to remote sensors or equipment to collect data, processing the sampled data, storing the processed sampled data in a memory of the system, evaluating the stored data against a set of rules, where if the predefined set of rules is not violated, the sampling of the ports is continued, but if the set of rules is violated, the processor selects a predefined interval of the stored data, packages the predefined interval of the stored data, and immediately transmits a message, including the packaged predefined interval of stored data, to the server.

It is to be understood that both the foregoing general description and the following detailed description are exemplary and explanatory and are intended to provide further explanation of the invention as claimed.

The accompanying drawings, which are included to provide a further understanding of the invention and are incorporated in and constitute a part of this specification, illustrate embodiments of the invention and together with the description serve to explain the principles of the invention.

BRIEF DESCRIPTION OF THE DRAWINGS

FIG. 5 is an example of a message structure used for communication of data between a system and a server in accordance with an embodiment of the invention.

FIG. 7 is another example of a message structure used for communication of data between a system and a server in accordance with an embodiment of the invention.

DETAILED DESCRIPTION OF EMBODIMENTS OF THE INVENTION

The systems and methods described herein address both the problems identified above and other problems as understood by those of skill in the art.

Although the systems and methods described herein are exemplified by embodiments and applications in the fields of petroleum and/or natural gas, the invention is not limited to these fields.

Figure 1:
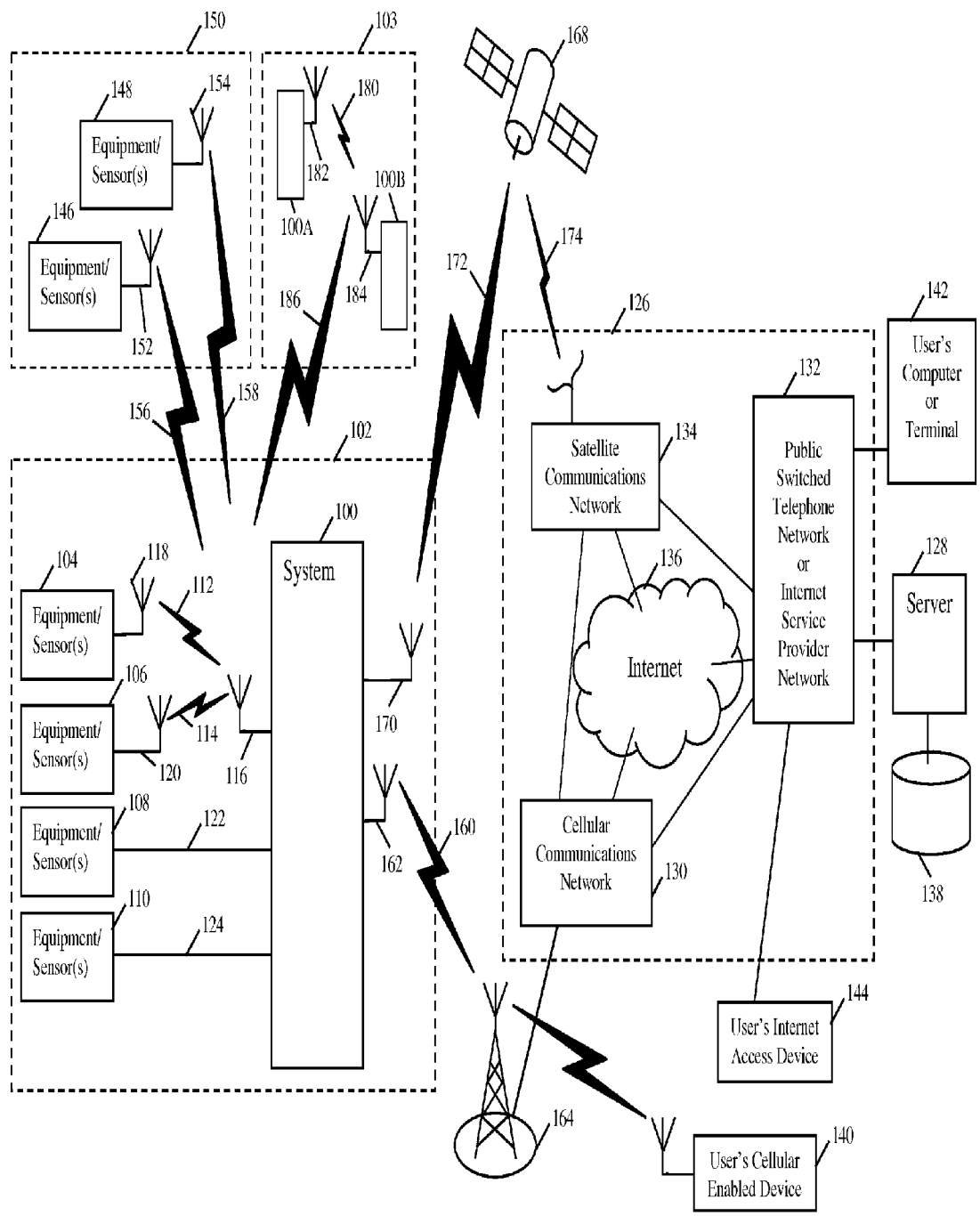
FIG. 1 is a block diagram illustrating an interrelationship between a system in accordance with an embodiment of the invention and other devices, systems, and networks that may be interfaced thereto.
Figure 3:
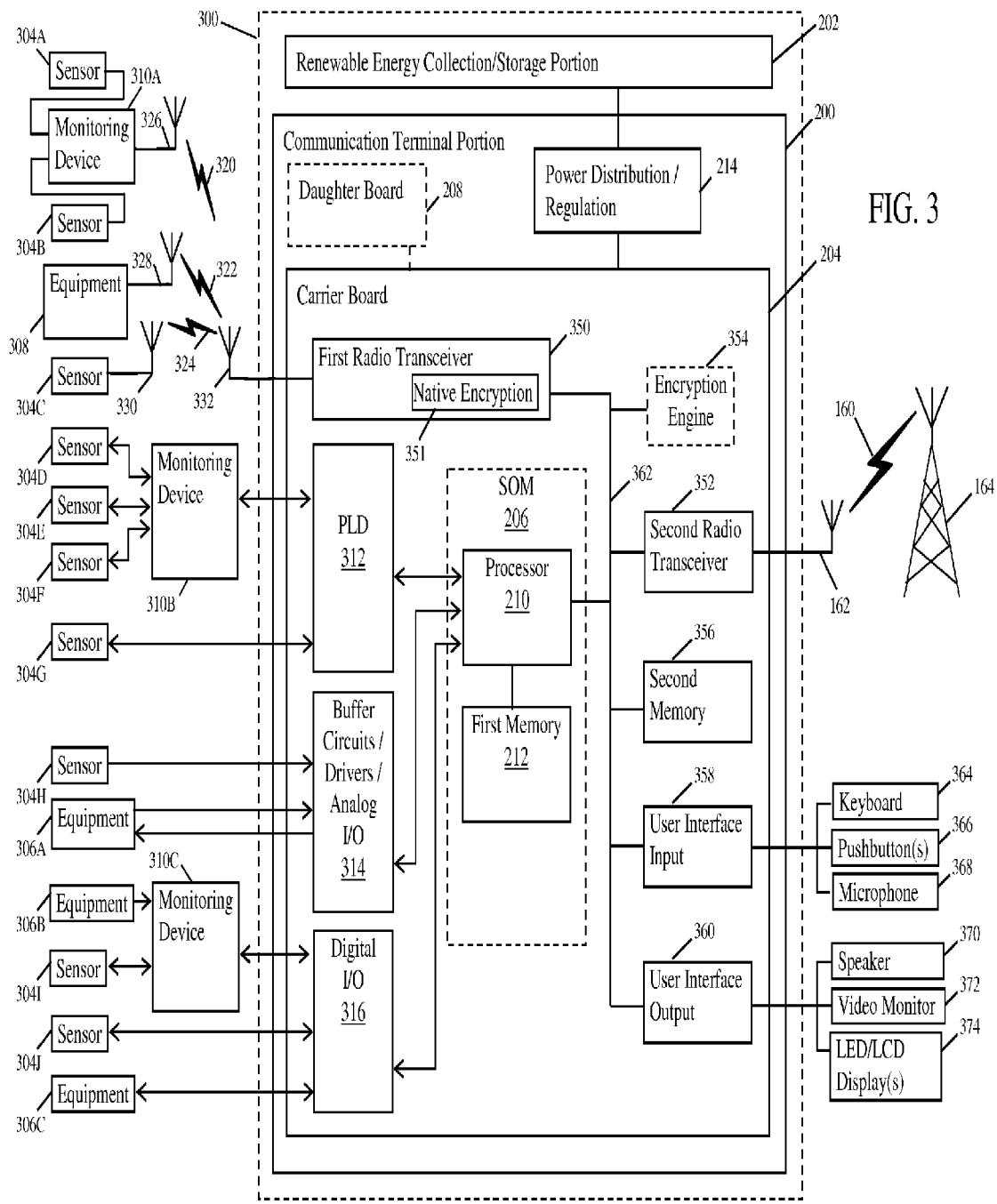
FIG. 3 is a block diagram illustrating various communication interfaces between a system in accordance with an embodiment of the invention, a plurality of sensors, equipment, monitoring devices, a first radio transceiver, and a second radio transceiver all in accordance with an embodiment of the invention.

FIG. 1 is a block diagram illustrating an interrelationship between a system 100 in accordance with an embodiment of the invention and other devices, systems (both similar and dissimilar to system 100), and networks that may be interfaced thereto. Embodiments of the invention as disclosed herein overcome the problems associated with providing a system 100, configured to control and/or monitor equipment/sensor(s) 104, 106, 108, 110, at a new or existing site 102 that does not have hardwired communications connections and/or electrical power available for use by the system 100. Embodiments of the invention as disclosed herein may be powered by renewable energy and may include at least one wireless communication interface to communicate with a remotely located server 128, via a typically preexisting cellular communications network 130. Additionally, systems 100 in accordance with embodiments of the invention may include wired and short-range wireless communication interfaces to communicate with the monitored/controlled equipment/sensor(s) 104, 106, 108, 110, 146, 148 at one or more sites 102, 150. Additionally, systems 100 in accordance with embodiments of the invention may include short-range wireless communication interfaces to communicate with one or more similar systems 100A, 100B at one or more other sites 103, 150. In the exemplary configuration illustrated in FIG. 3, a first similar system 100A at site 103 wirelessly communicates with a second similar system 100B at site 103 via a link 180 established between short-range wireless communication antennas 182, 184. The link 180 may be facilitated by use of radio transceivers similar to first radio transceiver 350 (FIG. 3). Second similar system 100B wirelessly communicates with system 100 via a link 186 established between short-range wireless communication antennas 184, 116. Again, the link 186 may be facilitated by use of radio transceivers similar to first radio transceiver 350 (FIG. 3). Other similar systems (not shown) can be daisy chained, or meshed, in this manner to extend the effective range of system 100; and to increase the number of data ports available at a given site.

A remotely located server 128 may generate commands that are transmitted to the system 100. Data collected by the system 100, and data reflecting the status of the system 100, may be transmitted from the system 100 to the server 128. The server 128 may be linked to one or more communication networks 126. Therefore, the system 100 may be commanded, via the server 128, from any place on earth with access to communication networks linked to the server 128. Likewise, a user with access to the server 128 can view and manipulate data from any place on earth with access to communication networks linked to the server 128. Due to the widespread linking of communication networks 126, operation of the system 100 and review and manipulation of the data received from the system, can be had from virtually any place on earth.

Moreover, the system 100 may operate autonomously. The system 100 may utilize a wireless cellular communications link 160 to receive and transmit data from and to, respectively, the server 128. In addition or alternatively, the system may utilize a wired link (not shown), such as Ethernet, if available. If the wireless link 160 and the wired link (if present) are broken, equipment/sensor(s) 104, 106, 108, 110 at site 102 may continue to be monitored by the system 100. In the event a predefined condition is detected by the system 100 (e.g., an event that indicates imminent equipment damage), the system 100 may triggered to take predetermined action to protect the equipment/sensor(s) 104, 106, 108, 110 from damage. By preventing damage to equipment/sensor(s) 104, 106, 108, 110 at the site 102, the system 100 and methods of operation of the system reduce the cost of repair and equipment maintenance, but moreover, protect the environment and human and animal life near the site 102 from dangerous or even life-threatening conditions.

The system 100 and methods of operating the system in accordance with embodiments of the invention utilize innovative data structures to package, transmit, and receive data. These innovative data structures minimize data overhead in communications messages and therefore minimize communication bandwidth used for communications between the system 100 and the server 128. This minimization of bandwidth results in cost savings for communications services and increases the speed of communications in comparison to transmission of data formatted in accordance with conventional data structures. Furthermore, use of the innovative data structures may permit the development of specialized procedures that can make use of enhanced functionality of the equipment/sensor(s) 104, 106, 108, 110. This enhanced functionality was not available using the data structures of standard protocols.

As described herein, a system 100 may utilize methods of operation of the system 100, and incorporate components or devices into the system, that are optimized to conserve electrical power and communication bandwidth/overhead. The overall system 100 and methods described herein are particularly useful and desirable based, for example, on their design, which stresses reduced consumption of power and reduced cost of communications.

In the embodiment of FIG. 1, the system 100 may be configured to collect data from, and/or control, equipment/sensor(s) 104, 106, 108, 110 at site 102. Unless specified otherwise, the use of the term "equipment" herein will be understood to mean any equipment coupled to the system 100 for purposes of monitoring and/or control. Such equipment may include, but is not limited to, equipment with integrated sensors, equipment functionally coupled to stand-alone sensors, or individual stand-alone sensors. Conversely, as used herein, the term "sensor" embodies any type of sensor, regardless of whether the sensor is integrated with equipment, coupled to equipment, or stand-alone.

In an exemplary deployment at a given site 102, the system 100 and equipment/sensor(s) 104, 106, 108, 110 may be located within about 100 yards of each other. Accordingly, as used hereinafter, the word "site" will be used to refer to an area in which the system 100 and equipment/sensor(s) 104, 106, 108, 110 are collocated and in relatively close proximity to one another. An oil or natural gas well, a pumping station, and an oil or natural gas storage area, which accommodates a system 100 in accordance with an embodiment of the invention, are all examples of a site 102.

Site 102 may include equipment, such as turbines, compressors, pumps, pressurized and unpressurized fluid storage vessels, and fluid transfer apparatus. Site 102 may be served by wireless communication networks, but are not necessarily served by either wired communication networks or sources of commercial electrical power (i.e., a site 102 may not be coupled to the power grid). Furthermore, sites such as site 102 may be in locations where it would be difficult, impractical, or expensive to connect the site to a wired communication network or the power grid.

Communication between the system 100 and the equipment/sensor(s) 104, 106, 108, 110 may be through short-range wireless communications links 112, 114. These types of links may operate in the industrial, scientific, and medical (ISM) radio bands using, for example, IEEE 802.15.4 and applications based on IEEE 802.15.4 such as DigiMesh and ZigBee. However, other short-range wireless communications standards may be used without departing from the scope of the invention. Likewise, long range radio links may also be within the scope of the invention.

In the exemplary embodiment of FIG. 1, a first system antenna 116 of system 100 exchanges signals with antennas 118, 120 of equipment/sensor(s) 104, 106. Additionally, hardwired connections 122, 124, such as single or multiple wire cables or fiber optics may be used for communication between system 100 and equipment/sensor(s) 108, 110.

One or more communication networks 126 may facilitate communication between the system 100 and a server 128. Examples of communication networks included a cellular telephone network 130, a public switched telephone network (PSTN) or a network configured by an Internet Service Provider (ISP) 132, and a satellite communications network 134. Each of the above-identified communications networks 130, 132, 134 can communicate with any of the other communications networks 130, 132, 134. As known to those of skill in the art, each of the communications networks 130, 132, 134 may also be linked to the others via the Internet 136. As used herein, unless explained otherwise, communication via the Internet includes communication from a first user equipment to a second user equipment via any one network, or combination of networks, such as networks 130, 132, 134 identified above. User equipment includes, but is not limited to telephones, modems, computers, terminals, and servers.

Data, including control data, may flow bi-directionally between the system 100 and the server 128. The server 128 may store data in a local database 138. The server 128 may additionally or alternatively store data in a remote database (not shown).

A user may send commands to the system 100, to command the system 100 to perform one or more actions with respect to itself or the equipment/sensor(s) 104, 106, 108, 110 coupled thereto. In accordance with an embodiment of the invention, all communication to or from the system 100 passes through or is generated by the server 128. Accordingly, when a user sends a command to the system 100, the user is actually commanding the server 128 to send a command to the system 100. This aspect of system control may be transparent to the user.

The user communicates with the system 100 (via server 128) by way of any piece of user equipment. For example, user equipment may include a user's cellular enabled device 140. Today's cellular enabled devices may include smartphones, tablets, and laptop computers. This list is not exhaustive. By way of another example, user equipment may include a user's laptop or desktop computer or a simple terminal 142. These devices may connect to one or more communication networks 126 via hardwired or wireless interfaces. As illustrated in FIG. 1, any device capable of communication via the Internet (i.e., an Internet access device) 144 can also permit a user to communicate with the system 100 (via the server 128) at anytime and from virtually anywhere.

In addition to communicating with equipment/sensor(s) 104, 106, 108, 110 co-located with the system 100 at the first site 102, the system 100 may also communicate with equipment/sensor(s) 146, 148 at a second site 150, some distance from the first site 102. As long as the antennas 152, 154 of equipment/sensor(s) 146, 148 at the second site 150 are within operational range of antenna 116 at the first site 102, wireless links 156, 158 can be established. Operational range between sites 102, 150 could be extended by use of repeaters (not shown) or by use of long-range wireless communication systems (e.g., similar to short-range wireless communications systems but with greater power output). Further, operational range between sites could be extended, and other benefits may be achieved, by meshing communications of the system 100 at the first site 102 with one or more similar systems 100A, 100B at additional sites, for example at site 103.

In accordance with an embodiment of the invention, the system 100 may process data collected from the equipment/sensor(s) 104, 106, 108, 110 prior to transmission to the server 128. Prior to data transmission, the system 100 may format the data in accordance with predefined data structures, which reduce or eliminate data overhead, thereby minimizing communication bandwidth. Use of these unique predetermined data structures reduces the cost of, and increases the speed of, communications from (and to) the system 100. The server 128 may process the data further, to prepare a trend analysis for example, and store the data in database 138. A user may view the data stored in database 138 via the user's Internet access device 144.

As noted above, embodiments of the system 100 find great utility in areas not serviced by wired communications networks. In a preferred embodiment, the system's 100 interface with the one or more networks 126 begins with a wireless link 160 between a second system antenna 162 and a wireless tower 164 coupled to a cellular communications network 130.

Additionally, or alternatively, the system 100 might communicate with a satellite 168 via a third system antenna 170. While satellite communication networks 134, such as that provided by Inmarsat, may provide near-worldwide communications coverage, their use is expensive. Accordingly, it may be preferable to have the system 100 communicate with the server 128 via cellular link 160 instead of satellite links 172, 174. However, nothing herein precludes embodiments of the invention from including satellite communications capability. Indeed, in some parts of the world, including some parts of the United States, satellite communication is the only type of communication available.

System 100 may be divided, conceptually as well as physically, into two portions: a communications terminal portion; and a power portion 202. Renewable energy may be used to supply the power portion 202. Likewise, conventional electric power, or the combination of renewable energy and conventional power may be utilized to supply the power portion 202.

Figure 2:
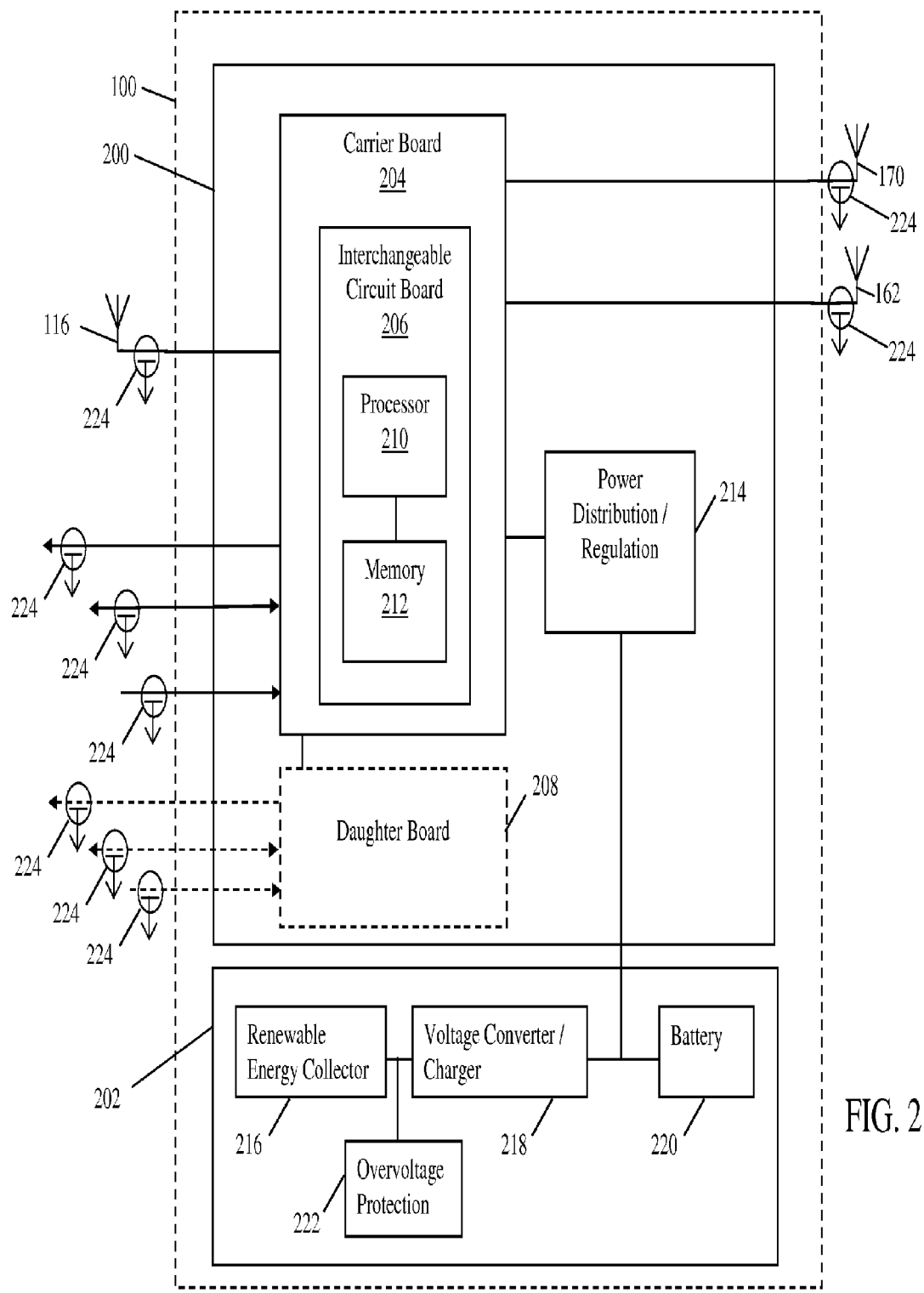
FIG. 2 is a block diagram illustrating the communications terminal portion and the renewable energy collection/storage portion of the system, all in accordance with the embodiment of the invention as depicted in FIG. 1.

FIG. 2 is a block diagram illustrating the communications terminal portion 200 and the power portion 202 of the system 100, all in accordance with the embodiment of the invention as depicted in FIG. 1. In the illustrated embodiment, the power portion 202 obtains energy from a renewable energy source. The energy is collected by a renewable energy collector 216.

The communications terminal portion 200 may include a main circuit board 204 (also referred to herein as a "carrier board 204") and may further include an interchangeable circuit board 206 (also referred to herein as a "SOM 206"). The interchangeable circuit board 206 may be removably connected to the main circuit board 204. If present, the interchangeable circuit board 206 is operationally coupled to the main circuit board 204. Additional circuit boards, referred to herein as daughter board(s) 208 may also be included in the communications terminal portion 200. If present, a daughter board 208 may also be operationally coupled to the interchangeable circuit board 206 via the main circuit board 204.

In one embodiment, the main circuit board 204 may support data input/output (I/O), data processing, and communications. For example, in one embodiment the main circuit board 204 supports Ethernet, USB, RS-232, and RS-422/RS-485 for wired communications, has sockets to support cellular wireless communications, and has one or more ISM radio modems (transceivers) to support local wireless communications.

In one embodiment, to support data I/O and control of equipment/sensor(s) 104, 106, 108, 110 (FIG. 1), the main circuit board 204 may include: software configurable analog inputs (such as four 16 bit 0-5V/0-10V/4-20 mA analog inputs); a 24V regulated supply; a 12V unregulated supply, a 5V regulated supply, and one or more each of: resistive thermal device (RTD) inputs; frequency counter inputs; general purpose I/O (GPIO); power meter (PWM) outputs; and outputs for relay/solenoid control. This list is not is not exclusive. In practice, the main circuit board 204 could be designed to support these and/or various other interfaces, inputs, or outputs without departing from the scope of the invention.

The interchangeable circuit board 206 may include a processor 210, memory 212, and all components and interconnections (not shown), required for the interchangeable circuit board 206 to operate as a computer system. In one embodiment, interchangeable circuit board 206, and the processor 210 thereon, operates according to a Linux-based operating system.

The interchangeable circuit board 206 may receive input from, and provide output to, the main circuit board 204. In one embodiment, the interchangeable circuit board 206 may be a System-on-Module (SOM) type Single Board Computer (SBC). As indicted above, "SOM" and "interchangeable circuit board" may be used interchangeably herein.

The SOM 206 may be a processor-based circuit that contains fixed functions for basic (i.e., core) functionality of the processor 210 and for services available to a user. For example, core functionality may include firmware and/or software to support memory, serial ports, electronic communications networks such as Ethernet, serial bus interfaces such as Integrated Interchip Sound (12S), audio, pulse width modulators (PWMs), timer/counters, analog-to-digital A/D conversion, digital I/O lines, and clock/calendar functions. The SOM 206 may further include programmable functions. These programmable functions can be altered by executing a series of commands stored in the memory 212 of the SOM 206. The commands may be executed by the processor 210.

The SOM 206 can be reprogrammed while connected to the main circuit board 204. Alternatively, as new technology becomes available, or if the SOM 206 malfunctions, the SOM 206 can be removed from the main circuit board 204 and replaced with a new, repaired, or reprogrammed SOM 206. In one embodiment, the processor 210 and memory 212 reside on the SOM 206. However, the invention is not limited thereto as the invention may be practiced by moving the processor, memory, and/or any functionality of the SOM 206 to the main circuit board 204. In an alternate embodiment, the invention could be practiced without the SOM 206, by use of, for example, a reconfigurable or non-reconfigurable programmable logic device (PLD), programmable array logic (PAL), or application specific integrated circuit (ASIC).

The daughter board 208 (if present) may include components to extend the functionality of, and/or to add additional or auxiliary inputs and outputs to, the system 100. For example, in one embodiment a daughter board 208 includes one or more 5V TTL outputs, solenoid/relay driver outputs, high side outputs, low side outputs, high current general purpose outputs (GPOs), and general purpose input/output (GPIO). Control and data transfer between one or more components included with the daughter board 208 and the processor 210 of the SOM 206 may be accomplished via a programmable logic device (PLD) (not shown).

The communications terminal portion 200 may further include one or more circuits configured to regulate and distribute power (hereinafter collectively referred to as "power distribution and regulation circuitry 214") drawn from the renewable energy collection/storage portion 202 of the system 100. Various types of power distribution and regulation circuitry 214 are known to those of skill in the art and will not be described herein.

As illustrated in the embodiment of FIG. 2, the components of the renewable energy collection/storage portion 202 include a renewable energy collector 216, a voltage converter/charger 218, a battery 220, and an overvoltage protection circuit 222. In one embodiment, the renewable energy collector 216 is a BP340J, manufactured by BP Solar. In one embodiment, the voltage converter/charger 218 is a SunSaver SS-6, manufactured by Morningstar Corporation. In one embodiment, the battery 220 is an absorption glass mat (AGM) sealed battery, model number DCM0060, manufactured by Interstate Battery.

The voltage converter/charger 218 receives electrical energy from the renewable energy collector 216 and converts the energy to a voltage suitable for storage in the battery 220. The voltage converter/charger 218 also manages the charging and discharging of the battery 220 and the conversion of the stored electrical power of the battery 220 to one or more predefined voltages delivered to the power distribution and regulation circuits 214.

In one embodiment, the voltage converter/charger 218 and battery 220 are enclosed in a vented, water resistant enclosure, while the components of the communications terminal portion 200 are enclosed in a separate waterproof enclosure. Data pertinent to the renewable energy collection/storage portion is transferred bidirectionally between the two portions 200, 202, while power is transferred from the renewable energy collection/storage portion 202 to the communications terminal portion 200.

In operation, the renewable energy collection/storage portion 202 may generate electrical energy from a renewable source, such as the wind or the sun. According to one embodiment, the renewable energy collection/storage portion 202 is the only source of power for the system 100. However, it is understood that during manufacture of a new or refurbished system 100 or repair or calibration of the system 100 in a laboratory or at the site 102 (FIG. 1), the system 100 may be configured to receive, and may receive, power from an alternate source (for example, from a portable power generator or a fixed power outlet) without departing from the scope of the invention.

In the embodiment of FIG. 2, an overvoltage protection circuit, or surge protector, 222 may be coupled to the electrical energy distribution network of the system 100, and may act as a shunt to ground in the event of an overvoltage condition, such as that caused by lightning striking the system 100. The overvoltage protection circuit 222 may include a dedicated system 100 lightening rod (not shown). Sites may typically include large quantities of metal, making the sites attractive to lightning. A site may even be protected by one or more of its own lightening rod(s). However, it was found that even if the system 100 included overvoltage protection on the system's internal electrical energy distribution network, the system 100 was still vulnerable to surges of power due to nearby lightning strikes, or strikes on the equipment/sensors 104, 106, 108, 110 coupled to the system by wiring. Antennas 116, 162, and 17 are also vulnerable to direct lightning strikes or to inducement of power surge due to nearby lightning strikes. Accordingly, in the embodiment of FIG. 2, the system 100 may include surge protection 222 on the system's internal power distribution network as well as surge protection 224 on each of the antennas 116, 162, 170 and all wired inputs/outputs of the system. The system 100 may have both one-way and/or two-way communication with equipment/sensors coupled to the system by wire. The system 100 may also supply power, by wire, to some of the equipment/sensors to which it is coupled. Therefore, wired inputs/outputs as referred to herein include both communications and power input/output.

FIG. 3 is a block diagram illustrating various communication interfaces between a system 300 (similar to 100) in accordance with an embodiment of the invention, a plurality of sensors 304, equipment 306, 308, monitoring devices 310, a first radio transceiver 350, and a second radio transceiver 352 all in accordance with an embodiment of the invention. In the exemplary embodiment of FIG. 3, the plurality of sensors 304, equipment 306, 308, monitoring devices 310 may communicate via analog interfaces, wired, and wireless communication interfaces. Examples of monitoring devices 310A, 310B, 310C include a system, such as an air quality monitoring system, or a combination voltage and current meter, which itself has multiple inputs and one or more outputs. Examples of sensors that may be monitored via analog inputs include liquid volume measuring equipment, resistive thermal devices that monitor temperature or barometric devices that monitor pressure. Other sensors may be monitored via digital inputs using a wired communications interface or monitored wirelessly. A monitoring device that may interface to the system by way of a wired communications interface includes, for example, a NuFlo MCII WP Flow Analyzer, which utilizes an RS 485/422 interface. A monitoring device that may interface to the system by way of a wireless ISM link includes, for example, an ABB uFLO 6213 flowmeter manufactured by TotalFlow.

The first radio transceiver 350 may be configured for short-range wireless communications at or near the site. The first radio transceiver 350 may operate in the ISM band. In one embodiment, the first radio transceiver 350 is an XBEE-PRO DigiMesh 2.40EM RF Module. The second radio transceiver 352 may be configured for wireless communication between the system 300 and the server 128 (FIG. 1). In a preferred embodiment, the second radio transceiver 352 is different from the first radio transceiver 352 and operates according to a telecommunications standard that is different from the telecommunications standard utilized by the first radio transceiver 350. In one embodiment, the second telecommunications standard may be a publically available mobile cellular telephone standard or a satellite communications standard. In a preferred embodiment of the invention, the second telecommunications standard is the GPRS standard used for mobile telephone communication.

The system 300 may further include a second memory 356, which may reside on the carrier board 204 or elsewhere in the system 300. The second memory 356, may store data for transmission to the server 128, data for backup or historical purposes, data relating to calibrations of equipment/sensor(s) coupled to the system, or any data deemed appropriate for storage thereon.

The system 300 may further comprise a user interface input 358 and a user interface output 360. These components 358, 360 may find great utility, for example, during instances of troubleshooting of the system 300, or in emergencies when a personal cellular telephone device or a personal satellite telephone device is not available to a user near the system 300 at the site.

The user interface input 358 may include one or more input devices, such as a keyboard 364, one or more push-buttons 366, or a microphone 368. The user interface output 360 may include one or more output devices such as a speaker 370, a video monitor 372, or an LED/LCD display 374.

The user interface input 358 and user interface output component 360 may support voice, video, or text communication between an entity proximal to the system 300 (such as a maintenance or repair person) and an entity remote to the system (such as an engineer in a corporate headquarters or a user in a different county, state, or country). The user interface input 358 and user interface output 360 may support a receipt of a command to be executed by the processor 210 that is entered by an entity proximal to the system (such as a maintenance or repair person) and/or display a result of the execution of the command to the entity proximal to the system.

The first radio transceiver 350, the second radio transceiver 352, the encryption engine 354 (if present), the second memory 356, the user interface input 358, and the user interface output 360 may all be operationally coupled to the processor 210 and first memory 212 via a communications bus 362. Although reference is made herein only to one communications bus 362, those of skill in the art will recognize that the system 300 may include various separate communication busses, which may or may not interface with each other according to their design and function. Additionally, other components, such as the digital I/O 316, may also be coupled to the communications bus 362 without departing from the scope of the invention.

In the exemplary embodiment of FIG. 3, a first subset of the plurality of sensors 304G, 304H, 304J, equipment 306A, 306C, and monitoring devices 310B, 310C are directly coupled to various digital and analog I/O ports of components 312, 314, 316. Components 312, 314, 316 may be included with the carrier board 204 of a communications terminal portion 200 of the system 300. A non-exhaustive list of examples of the various components 312, 314, 316 may include a PLD, buffer circuits/drivers/analog I/O, and digital I/O, respectively. A second subset of sensors 304A, 304B, 304D-304F, 304I and equipment 306B are directly coupled monitoring devices 310A, 310B, 310C. Monitoring device 310A, equipment 308, and sensor 304C are wirelessly coupled to the carrier board 204 via the links 320, 322, 324 between their respective antennas 326, 328, 330 and antenna 332 coupled to the first radio transceiver 350. It is understood that a single radio transceiver, such as first radio transceiver 350, may establish a plurality of ports, each of which may be considered as a virtual port. As used herein, the term "port" is used to refer to either or both of a physical port and a virtual port.

Wired interfaces to the components 312, 314, 316 of the carrier board 204 may utilize various standards for wired communication such as Ethernet 10/100 BaseTX, USB, or RS232/422/485. Other wired interface standards are within the scope of the invention. In one embodiment, first radio transceiver 350 operates according to the ISM standard. Other wireless interface standards are within the scope of the invention.

In the exemplary embodiment of FIG. 3, some of the plurality of sensors 304, equipment 306, 308, and monitoring devices 310, may continually output an analog voltage or current, while others may only provide data upon receipt of a command from the system 300.

In a preferred embodiment, data exchanged wirelessly via the first radio transceiver 350 for local wireless communication between the system 300, sensor 304K, equipment 308, and monitoring device 310C is encrypted by the native encryption engine 351 of first radio transceiver 350. Additional or alternative encryption capabilities may be provided by encryption engine 354, if present. Encryption is applied before transmission. Encryption of this data is desirable to prevent persons that are not authorized to receive such data from intercepting or maliciously substituting invalid data for valid data during the data exchange.

In accordance with an embodiment of the invention, data from the system 300 to the server 128 can be automatically provided to the server 128 according to a predetermined schedule. Data from the system 300 to the server 128 could alternatively or additionally be provided in response to a specific request, from the server 128 to the system 300, to provide data. Such a request may be initiated by a user interfaced with the server 128.

For wireless communication between the system 300 and the server 128, the processor 210 formats the data according to a set of unique predefined variable length bit coded sequences. The system 300 utilizes second radio transceiver 352 to communicate with the server 128 via a mobile communications telephone system standard such as CDMA, GPRS, or UMTS. Services offering wireless cellular communications according to these standards may be provided, by way of example, by AT&T or Sprint.

The data communicated between the system 300 and the server 128 is referred to herein as "backhaul data." The backhaul data travels along a backhaul data traffic path. Data to be transmitted from the system 300 onto the backhaul data traffic path is not encrypted prior to input into the second radio transceiver 352.

By not encrypting the data prior to input into the second radio transceiver 352, the system 300 reduces data overhead that would otherwise be occupied by headers and trailers that would have preceded and followed encrypted versions of the data transmitted along the backhaul data traffic path. Data security is nevertheless provided, via the native data encryption used in any given mobile communications telephone system.

The system 100, 300 and methods of using the system in accordance with embodiments of the invention utilize bandwidth purchased from third parties for the backhaul data path. Minimizing bandwidth on the backhaul data path preserves system power (as less data is transmitted in comparison to the amount of data that would be transmitted had the data been encrypted prior to transmission on the backhaul data path) and thus increases system battery operating time. Minimizing bandwidth on the backhaul data path also results in a reduction in system operating costs, as "space" on the backhaul data traffic path is typically purchased as a function of bandwidth used.

To prolong operation time of the system 300, the processor 210 may be configured to execute commands that reduce power consumption of the system 100, 300 from a predefined "nominal" (or operating) level to less than or equal to a maximum predefined "low" (or standby) level. The nominal level is greater than the low level. Power reduction may occur during preplanned periods of inactivity. In one embodiment, the predefined nominal level is 100 ma @ 12 VDC, while the predefined maximum low level is 35 ma @ 12 VDC. It will be understood that the claimed invention is not limited to these values, which are presented as examples only. The nominal and low levels may vary based, for example, on the requirements of sensors, equipment, and monitoring devices coupled to the system 300, as well as ambient temperature near the system 300.

Figure 4:
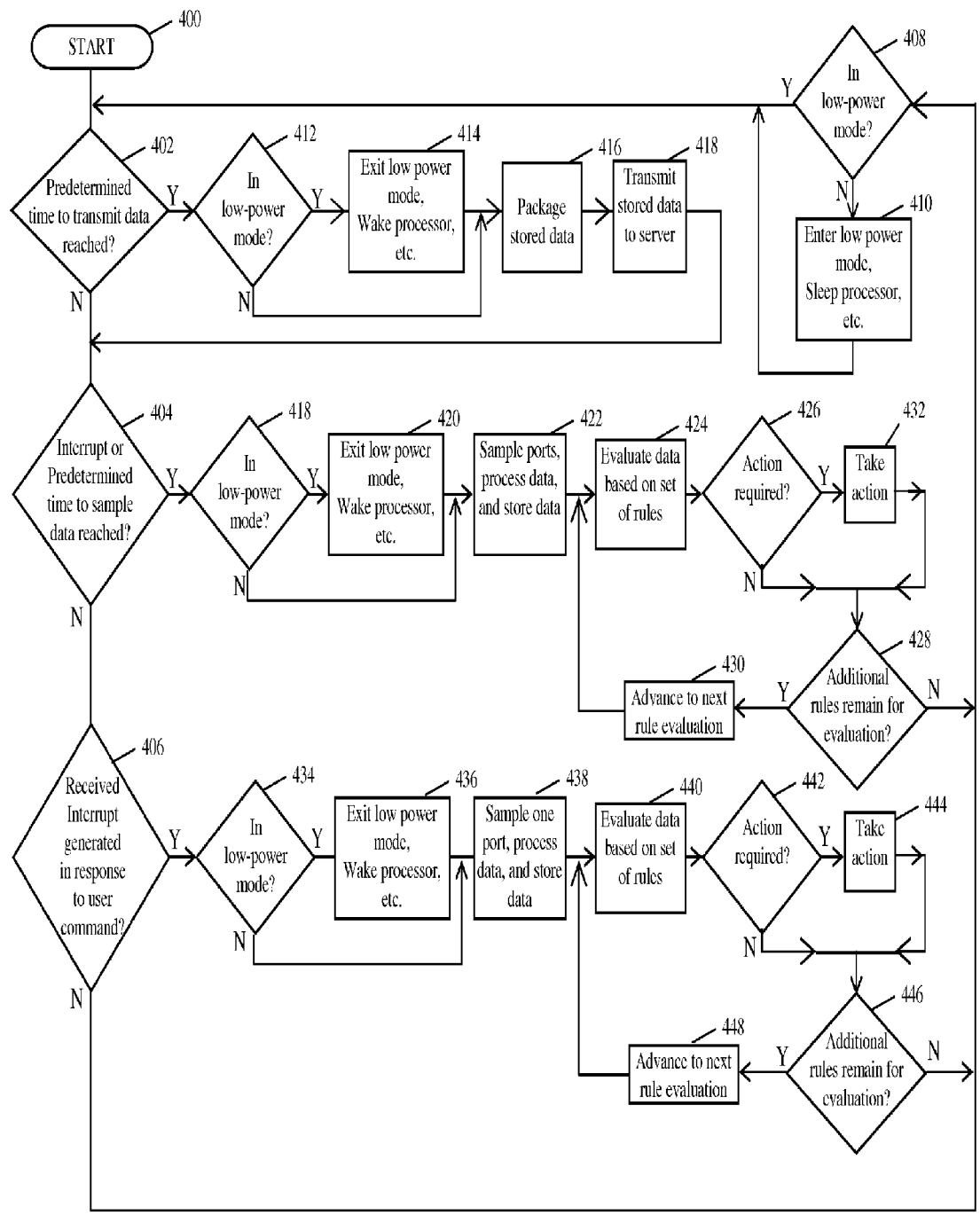
FIG. 4 is a flow diagram of a method of operation of a system in accordance with an embodiment of the invention.

FIG. 4 is a flow diagram of a method of operation of a system (similar to 100, 300) in accordance with an embodiment of the invention. At 400, the method may begin. At 402, the processor or a timer may determine if a predetermined time to transmit data has been reached. If the predetermined time to transmit data has not been reached, the method proceeds to 404. At 404, the processor or a timer may determine if a predetermined time to sample data has been reached. If the predetermined time to sample data has not been reached, the method proceeds to 406. At 406, the processor or a dedicated circuit may determine if an interrupt received by the system was generated in response to a user command. If it is determined that the interrupt generated in response to the user command was not received, the method may continue to 408. At 408, it is determined if the system is in a low power (or power saving) mode. If the system is not in a low power mode, then, at 410, the processor executes commands stored in a memory, which will cause the system to enter a low power mode. The method then returns to 402. However, if, at 408, the system is in a low power mode, the method will also return to 402.

If at 402, the predetermined time to transmit data has been reached, the method proceeds to 412. At 412, it is determined if the system is in a low power (or power saving) mode. If the system is in a low power mode, then, at 414, the processor executes commands stored in the memory, which will cause the system to exit the low power mode and the processor will be caused to wake. The method then proceeds to 416. However, if, at 412, the system is not in a low power mode, the method will also proceed to 416. At 416, stored data is packaged. At 418, the stored data is transmitted to the server. The method then returns to 404.

At 404, if it is determined that an interrupt generated in accordance with a preplanned schedule is received, or if a predetermined time to sample data was reached, the method proceeds to 418. At 418, it is determined if the system is in a low power (or power saving) mode. If the system is in a low power mode, then, at 420, the processor executes commands stored in the memory, which will cause the system to exit the low power mode and the processor will be caused to wake. The method then proceeds to 422. However, if, at 418, the system is not in a low power mode, the method will also proceed to 422.

At 422, the processor executes commands resulting in the sampling of ports associated with either the interrupt of 404 or the predetermined time of 404. Remote sensors or equipment are coupled to the ports. The ports that are sampled are those ports that are associated with the interrupt or those ports that are associated with the predetermined time. The sampled data is processed, and then stored in a memory of the system. Stored data is eventually packaged and transmitted to the server at steps 416 and 418.

The method continues to 424, where the processor evaluates the stored data against a predefined set of rules. If, as a result of the evaluation, it is determined the no rules were violated, and therefore no action is required, the method proceeds to 428. At 428 it is determined if any additional rules remain for evaluation. If no additional rules remain for evaluation, the method proceeds to 408 and returns to 402. The method thus circulates, continuing with determining if interrupts or predetermined times to sample data are reached at 404, and if so, proceeding along the Y branch of 404 as described above, and continuing to determine if the time to transmit packaged stored data was reached at 402, and if so, proceeding along the Y branch of 402.

If, at 428, additional rules do remain for evaluation, the method advances to the next rule at 430, and then returns to 424, where the stored data is evaluated against the next rule. Rules may be evaluated to determine, based on the collected data, and in view of previously collected data, whether any action must be taken with respect to control of the monitored sensors, equipment or monitoring devices. For example, if a coolant temperature of an engine at the site is determined to be higher than nominal but not critically high, the processor may cause a message to be sent to a user alerting the user of the out of normal temperature. However, if the coolant temperature of the engine at the site is determined to be critically high, the processor may execute commands stored in the memory to either reduce the load on the engine, or shut off the engine and equipment associated with the engine in order to prevent damage. Nearly simultaneously, the processor may cause a message to be sent to the server. The server may generate and transmit alerts to one or more users to alerting the one or more users of the critically high temperature. The server may also advise the one or more users of the steps taken by the system to protect the equipment at the site. By way of further example, one action may include transmitting a message to the server, where the message includes data indicative of an alarm, and data related to the rule that was violated, By way of another example, internal data, which is data related to the operation of the system itself, including the energy collection and storage portion and the communication terminal portion may also be sampled processed and stored. If the processing of this internal data leads to a conclusion that a rule is violated, then action is also taken in this regard. For example, if the internal data indicates that the battery is unable to hold a charge, or that the internal temperature of the communication terminal portion has exceeded a predefined maximum, then one of the actions taken may be for the system to shut itself down in order to prevent damage. Accordingly, if at 426 it is determined that some predetermined action must be taken in response to a rule evaluation, then at 432 the processor executes instructions stored in the memory to take such required action. Following the taking of an action at 432, the he method then returns to 428, where it is determined if any additional rules remain for evaluation, and so on.

Returning to 404, if at 404 it is determined that no interrupt was received and the predetermined time to sample the data was not reached, the method proceeds to 406. If at 406 it is determined that an interrupt was received by the system, but the interrupt was generated in response to a user command, the method proceeds to 434. Such an interrupt may be sent when, for example, a user desires new data from a specific remote sensor or piece of equipment coupled to the system.

At 434, it is determined if the system is in a low power (or power saving) mode. If the system is in a low power mode, then, at 436, the processor executes commands stored in the memory, which will cause the system to exit the low power mode and the processor will be caused to wake. The method then proceeds to 438. However, if, at 434, the system is not in a low power mode, the method will also proceed to 438.

At 438, the processor causes the system to sample one port, identified by the interrupt associated with the user command, process the data from the one port, and store the data from the one port. At 440 the data is evaluated against a set of rules. As before, if, at 442 is determined that action is required, then action is taken at 444. In this instance, action may include packaging the stored data of 438 and transmitting the packaged data to the server. If at 442 it is determined that no action is required, the method proceeds to 446 to determine if additional rules remain for evaluation. If additional rules remain, the method advances to the next rule at 448 and returns to evaluate the rule at 440, and so on. If, at 446, it is determined that additional rules do not remain, the method proceeds to 408, and again begins its recirculation through 402, 404, and 406 and so on.

Additional situations may result in the transmission of data to the server 128. For example, a current value of processed data that is different from a previous value of corresponding processed data (indicating a change of state, so to speak, of perhaps a value that had remained constant for some time) may indicate a problem. In one embodiment, the detection of such a change of state may result in a transmission of a message, which includes the current value of the processed data, to the server 128. The message may be transmitted substantially immediately upon detection of the change of state. In some embodiments, a user may find it beneficial to view data that precedes a rule violation or an abnormal condition that may cause a message to be sent to the server 128. Therefore, for example, according to predefined instructions, the processor may include in a message a predefined interval of stored data, such as the last fifteen samples preceding a rule violation, or any interval preceding the rule violation, package the predefined interval of stored data, and transmit a message that includes the packaged predefined interval of stored data to the server 128 upon detection of a rule violation. The message may be transmitted substantially immediately upon detection of the change of state.

FIG. 5 is an example of a message structure used for communication of data between a system and a server in accordance with an embodiment of the invention. The message structure depicted in the embodiment of FIG. 5 is one example of the unique predefined variable-length bit-coded sequences used by the system 100 and server 128, when the system 100 and server 128 are configured in a client-server architecture. In this type of architecture the client always initiates a connection towards the server 128. The system 100 may operate according to sets of predefined procedures. For many procedures, the system 100 acts as the client while the server 128 acts as the server. There are cases where the roles are reversed and the server 128 acts as the client and the system 100 as the server. These cases require a special mechanism in place to make sure that the system 100 is awake when the server 128 is trying to contact it. A link establishment procedure may be used to describe a "tap on the shoulder" mechanism used to wake-up the system 100. All the messaging described in the exemplary link establishment procedure occurs between the system 100 and the server 128.

Figure 6:
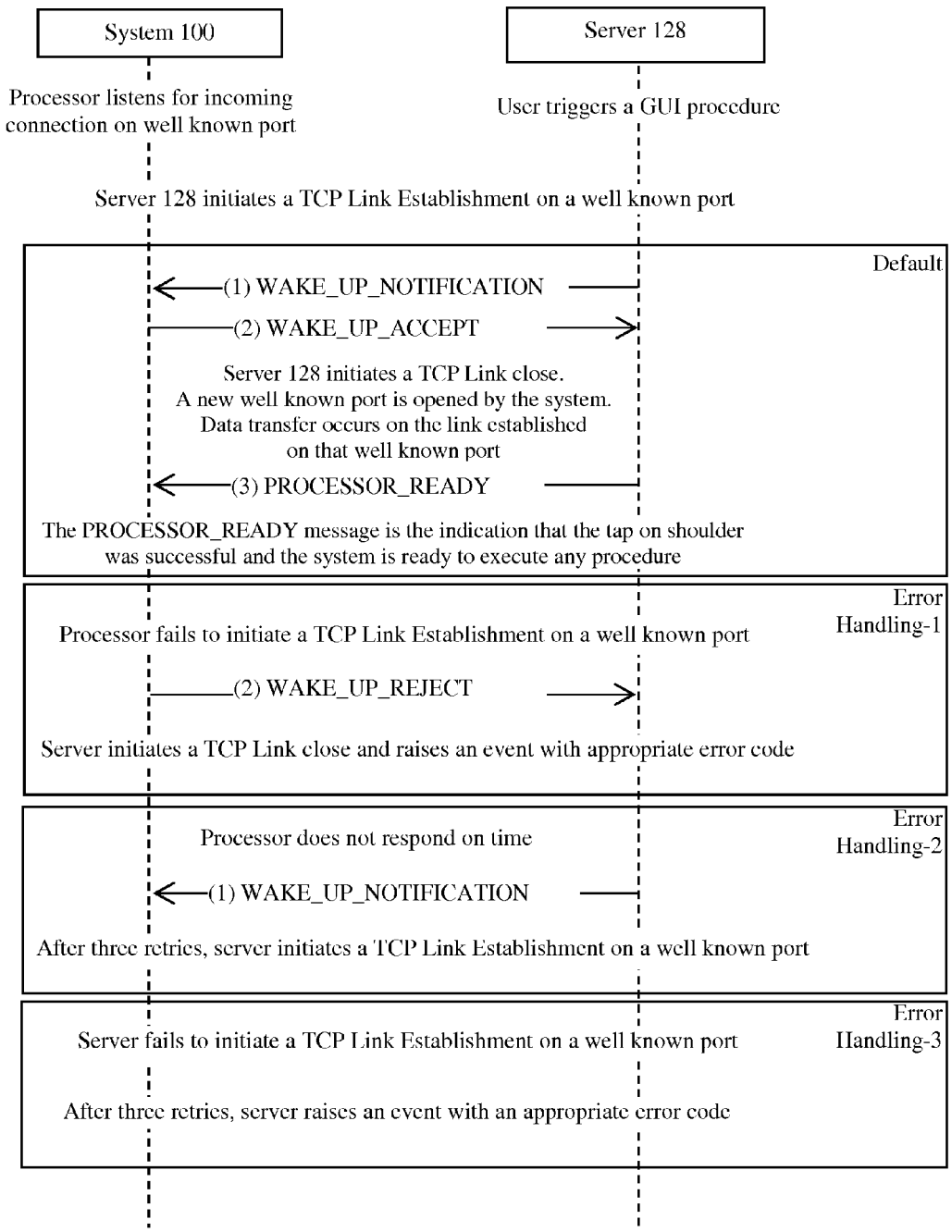
FIG. 6 is a diagram of the data flow between a system and a server when implementing the procedure related to FIG. 5, in accordance with an embodiment of the invention.

FIG. 6 is a diagram of the data flow between a system and a server when implementing the procedure related to FIG. 5, in accordance with an embodiment of the invention. In FIG. 6, it is understood that the processor of system 100 is listening for an incoming connection on a well known port. On the server 128 side, it is understood that a user, perhaps using a graphical user interface (GUI), triggers a procedure. The server 128 initiates a TCP Link Establishment on a well known port as shown by the default process and the three error handling processes.

FIG. 7 is another example of a message structure used for communication of data between a system and a server in accordance with an embodiment of the invention. The message structure depicted in the embodiment of FIG. 5 is another example of the unique predefined variable-length bit-coded sequences used by the system 100 and server 128. The messages of FIG. 7 are useful for uploading statistics messages from the system 100 to the server 128. As illustrated in the message type UL_DATA, 16 bits are reserved for indicating the length of the data represented by the block at the far right of the data structure. In this block, n bytes of data are zipped for transfer to the server 128.

Figure 8:
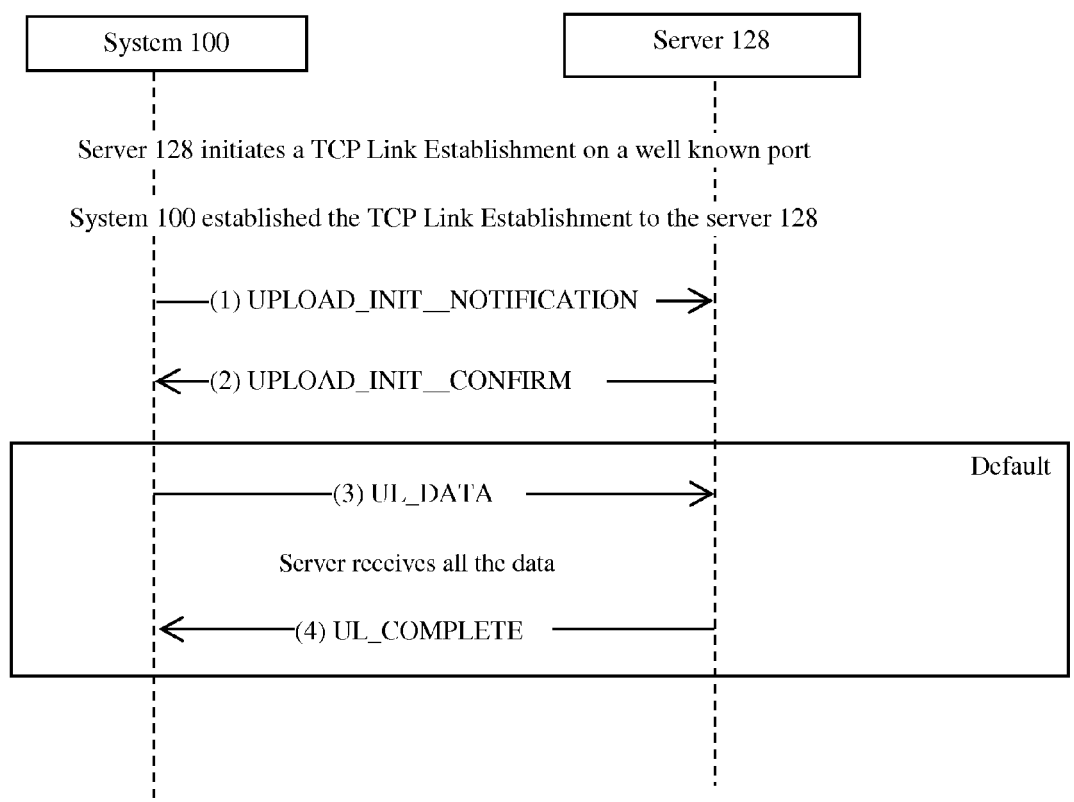
FIG. 8 is a diagram of the data flow between a system and a server when implementing the procedure related to FIG. 7, in accordance with an embodiment of the invention.

FIG. 8 is a diagram of the data flow between a system and a server when implementing the procedure related to FIG. 7, in accordance with an embodiment of the invention. In FIG. 8, it is understood that the system 100 established a TCP Link to the server 128. It is further understood that upon completion of the process the server has received all of the uploaded data.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, other electronic units, and combinations thereof, which are designed to perform the aforementioned functions. In software implementation, the present invention can be implemented with a module for performing the aforementioned functions. Software is storable in a memory unit and executed by the processor. Various devices widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A self-sustaining, autonomous, monitoring, reporting, and control system, comprising:
    a processor;
    a memory;
    a communications bus operationally coupled to the processor and the memory;
    a first radio transceiver, operationally coupled to the processor and operating according to a first telecommunications standard;
    a second radio transceiver, different from the first radio transceiver, operationally coupled to the processor and operating according to a second telecommunications standard, different from the first telecommunications standard;
    a plurality of wired ports, each of the plurality of wired ports defining one of a first plurality of data channels, each one of the first plurality of data channels coupled to the communications bus via a respective telecommunications adapter;
    a plurality of wireless ports, each of the plurality of wireless ports defining one of a second plurality of data channels, each of the second plurality of data channels coupled to the communications bus via the second radio transceiver;
    a power system configured to convert energy into respective operating voltages for at least the processor, the memory, and the first and second radio transceivers and store excess energy; and
    electrical circuits, configured as surge protectors, coupled to each of the plurality of wired ports, an antenna of the first radio transceiver, an antenna of the second radio transceiver, and a power distribution network of the power system, to protect electrical components of the self-sustaining, autonomous, monitoring, reporting, and control system from an overvoltage,
    wherein the processor receives unencrypted data from the first and second pluralities of data channels, packages the unencrypted data into predefined unencrypted data structures, and forwards the packaged unencrypted data to the second radio transceiver, where the packaged unencrypted data is transmitted according to the second telecommunications standard.

2. The system of claim 1, wherein the first radio transceiver is an industrial, scientific, and medical (ISMS) modem.

3. The system of claim 1, wherein the second radio transceiver is a mobile cellular telephone transceiver.

4. The system of claim 1, wherein the power system comprises:
    a collection device configured to collect energy from a renewable energy source and convert the energy into electrical power;
    a rechargeable battery, operationally coupled to the collection device and configured to store the electrical power; and
    a charging/controlling converter, configured to charge the rechargeable battery and convert the stored electrical power to a predefined voltage to operate the system.

5. The system of claim 1, wherein the energy is renewable and the renewable energy is the only source of energy for the system.

6. The system of claim 1, wherein both the first radio transceiver and the second radio transceiver are terrestrial radio transceivers.

7. The system of claim 1, wherein at least one of the first radio transceiver and the second radio transceiver is a satellite radio transceiver.

8. The system of claim 1, further comprising an audio communication system configured to support voice communication between an entity proximal to the system and an entity remote to the system, the audio communication system comprising:
    an audio communication input device operationally coupled to the second radio transceiver; and
    an audio communication output device operationally coupled to the second radio transceiver.

9. The system of claim 8, wherein the audio communication input device is a microphone and the audio communication output device is a speaker.

10. The system of claim 1 wherein the system further comprises:
    a main circuit board, wherein the main circuit board:
        supports one or more of: Ethernet, Universal Serial Bus (USB), RS-232, and RS-422/RS-485 for wired communications, and has sockets for cellular and industrial, scientific, and medical (ISM) radio modems for wireless communications; and
    an interchangeable circuit board, wherein the processor and components required by the processor to operate as a computer system are included on the interchangeable circuit board, and the interchangeable circuit board is removably connected to, receives all input from, and provides output to, the main circuit board.

11. The system of claim 1, wherein unencrypted data packaged into predefined data structures is transferred from the second radio transceiver to the processor, unpackaged according to instructions stored in the memory, and forwarded to one or more of the first and second pluralities of data channels.

12. A self-sustaining, autonomous, monitoring, reporting, and control system, comprising:
    a processor;
    a memory;
    a communications bus operationally coupled to the processor and the memory;
    a first radio transceiver, operationally coupled to the processor and operating according to a first telecommunications standard;

a second radio transceiver, different from the first radio transceiver, operationally coupled to the processor and operating according to a second telecommunications standard, different from the first telecommunications standard;

a plurality of wired ports, each of the plurality of wired ports defining one of a first plurality of data channels, each one of the first plurality of data channels coupled to the communications bus via a respective telecommunications adapter;

a plurality of wireless ports, each of the plurality of wireless ports defining one of a second plurality of data channels, each of the second plurality of data channels coupled to the communications bus via the second radio transceiver;

a power system configured to convert energy into respective operating voltages for at least the processor, the memory, and the first and second radio transceivers and store excess energy;

a local data entry device operationally coupled to the processor and configured to receive a command to be executed by the processor from an entity proximal to the system; and a local data output device operationally coupled to the processor and configured to display a result of execution of the command to the entity proximal to the system, wherein the processor receives unencrypted data from the first and second pluralities of data channels, packages the unencrypted data into predefined unencrypted data structures, and forwards the packaged unencrypted data to the second radio transceiver, where the packaged unencrypted data is transmitted according to the second telecommunications standard.

13. The system of claim 12, wherein:
the local data entry device is one of a push-button, a touch screen, and a keyboard; and
the local data output device is one of a light emitting diode (LED) display and a liquid crystal display (LCD) display.

14. The system of claim 12, wherein the first radio transceiver is an industrial, scientific, and medical (ISM) modem.

15. The system of claim 12, wherein the second radio transceiver is a mobile cellular telephone transceiver.

16. The system of claim 12, wherein unencrypted data packaged into predefined data structures is transferred from the second radio transceiver to the processor, unpackaged according to instructions stored in the memory, and forwarded to one or more of the first and second pluralities of data channels.

17. A self-sustaining, autonomous, monitoring, reporting, and control system, comprising:
a processor;
a memory;
a communications bus operationally coupled to the processor and the memory;
a first radio transceiver, operationally coupled to the processor and operating according to a first telecommunications standard;
a second radio transceiver, different from the first radio transceiver, operationally coupled to the processor and operating according to a second telecommunications standard, different from the first telecommunications standard;
a plurality of wired ports, each of the plurality of wired ports defining one of a first plurality of data channels, each one of the first plurality of data channels coupled to the communications bus via a respective telecommunications adapter;
a plurality of wireless ports, each of the plurality of wireless ports defining one of a second plurality of data channels, each of the second plurality of data channels coupled to the communications bus via the second radio transceiver; and
a power system configured to convert energy into respective operating voltages for at least the processor, the memory, and the first and second radio transceivers and store excess energy,
wherein the processor receives unencrypted data from the first and second pluralities of data channels, packages the unencrypted data into predefined unencrypted data structures, and forwards the packaged unencrypted data to the second radio transceiver, where the packaged unencrypted data is transmitted according to the second telecommunications standard, and
wherein the processor is configured to execute commands that reduce power consumption of the system from a predefined nominal level to less than or equal to a maximum predefined low level, which is less than the predefined nominal level, during preplanned periods of inactivity.

18. The system of claim 17, wherein the first radio transceiver is an industrial, scientific, and medical (ISM) modem.

19. The system of claim 17, wherein the second radio transceiver is a mobile cellular telephone transceiver.

20. The system of claim 17, wherein unencrypted data packaged into predefined data structures is transferred from the second radio transceiver to the processor, unpackaged according to instructions stored in the memory, and forwarded to one or more of the first and second pluralities of data channels.

* * * * *